(12) United States Patent
Fuwa et al.

(10) Patent No.: US 7,258,720 B2
(45) Date of Patent: Aug. 21, 2007

(54) METAL POWDER COMPOSITION FOR USE IN SELECTIVE LASER SINTERING

(75) Inventors: Isao Fuwa, Osaka (JP); Norio Yoshida, Nara (JP); Shushi Uenaga, Moriguchi (JP); Toshiharu Iwanaga, Hirakata (JP); Yoshikazu Higashi, Moriyama (JP); Hirohiko Togeyama, Tondabayashi (JP); Satoshi Abe, Moriguchi (JP); Masataka Takenami, Osaka (JP); Takashi Shimizu, Kadoma (JP)

(73) Assignee: Matsushita Electric Works, Ltd., Osaka (JP)

( * ) Notice: Subject to any disclaimer, the term of this patent is extended or adjusted under 35 U.S.C. 154(b) by 112 days.

(21) Appl. No.: 10/780,576

(22) Filed: Feb. 19, 2004

(65) Prior Publication Data

US 2004/0182201 A1 Sep. 23, 2004

(30) Foreign Application Priority Data

Feb. 25, 2003 (JP) ............................. 2003-048263

(51) Int. Cl.
*B22F 1/00* (2006.01)
(52) U.S. Cl. ....................................... 75/252
(58) Field of Classification Search ................. 75/252, 75/354
See application file for complete search history.

(56) References Cited

U.S. PATENT DOCUMENTS

| 5,429,792 | A | * | 7/1995 | Luk ............................ 419/36 |
|---|---|---|---|---|
| 5,484,469 | A | | 1/1996 | Rutz et al. |
| 5,732,323 | A | * | 3/1998 | Nyrhila ......................... 419/2 |
| 5,745,834 | A | * | 4/1998 | Bampton et al. ............. 419/37 |
| 5,872,322 | A | * | 2/1999 | Mocarski et al. ............. 75/246 |
| 5,937,265 | A | * | 8/1999 | Pratt et al. .................... 75/246 |
| 5,950,063 | A | * | 9/1999 | Hens et al. .................... 419/5 |
| 5,997,805 | A | * | 12/1999 | Lawcock et al. ............. 419/28 |
| 6,068,813 | A | * | 5/2000 | Semel .......................... 419/66 |
| 6,338,747 | B1 | * | 1/2002 | Kosco .......................... 75/243 |
| 6,621,039 | B2 | * | 9/2003 | Wang et al. ............. 219/121.6 |
| 6,630,009 | B2 | * | 10/2003 | Moussa et al. ............... 75/255 |
| 2002/0146341 | A1 | * | 10/2002 | Mars et al. ................... 419/11 |

FOREIGN PATENT DOCUMENTS

| DE | 10039144 | 11/2001 |
|---|---|---|
| JP | 2001-152204 | 6/2001 |
| WO | 02/11929 | 2/2002 |

OTHER PUBLICATIONS

English Language Abstract of JP 2001-152204.
English language Abstract of DE 10039144.

* cited by examiner

*Primary Examiner*—Hoy King
*Assistant Examiner*—Ngoclan T. Mai
(74) *Attorney, Agent, or Firm*—Greenblum & Bernstein, P.L.C.

(57) ABSTRACT

A three-dimensional object of a desired shape is made by irradiating an optical beam on a metal powder layer to form a sintered layer and by laminating such sintered layer one above another. A metal powder composition for use in making such a three-dimensional object includes an iron-based powder material, a nickel and/or nickel alloy powder material, a copper and/or copper alloy powder material, and a graphite powder material. The graphite powder material acts to enhance the wettability during melting and to reduce microcracks during solidification.

15 Claims, 7 Drawing Sheets

METAL POWDER COMPOSITION FOR USE IN SELECTIVE LASER SINTERING

BACKGROUND OF THE INVENTION

1. Field of the Invention

The present invention relates generally to selective laser sintering and, in particular but not exclusively, to a metal powder composition for use in selective laser sintering wherein a three-dimensional object of a desired shape is made by irradiating an optical beam on a metal powder layer to form a sintered layer and by laminating such sintered layer one above another. The present invention also relates to a method of making the metal powder composition and to a three-dimensional object shaped with the use of the metal powder composition.

2. Description of the Related Art

A method of making a three-dimensional object with the use of selective laser sintering is known, wherein an optical beam (directional energy beam, for example, a laser) is first irradiated on a predetermined portion of a layer of metal powder composition to form a sintered layer. The sintered layer thus obtained is then covered with a new layer of metal powder composition, and the optical beam is irradiated on a predetermined portion of the new layer to form a new sintered layer, which is united with the underlying layer. These processes are repeatedly carried out to form a sintered article or three-dimensional object in which a plurality of sintered layers are firmly laminated one above another. This method makes it possible to obtain a shaped object of various states including a state in which there are so many spaces (holes) inside the shaped object and a state in which the metal powder composition has been melted substantially completely and then solidified, i.e., a state having a density (sintered density) of approximately 100% by controlling the energy density of the optical beam. For this reason, this method can be used to make a forming die that is required to have a smooth surface. In addition, this method enables a surface region of a shaped object to have a high density, an internal region to have a low density, and a region therebetween to have an intermediate density. In the case where the shaped object has a varying density, the shaping speed is not sacrificed for the smooth surface.

However, making such a shaped object having different surface and internal densities requires a metal powder composition having characteristics that differ from those of a metal powder composition to be used in normal powder sintering.

By way of example, the particle diameter of the metal powder composition has to be smaller than the thickness of each powder layer. A smaller particle diameter increases the packing density of the powder composition and the absorptivity of the optical beam during shaping and, hence, not only can the shaping density be increased but the surface roughness can also be reduced. However, a too small particle diameter sometimes causes cohesion of the powder composition, resulting in a reduction in packing density of the powder composition and making it impossible to uniformly form a thin powder layer.

Furthermore, in order for the shaped object to have a required strength, a portion irradiated with the optical beam and an underlying sintered layer have a large bonding area and a high adhesion strength. Also, the portion irradiated with the optical beam must not have a big rise or protrusion on the upper surface thereof. If such a rise is higher than the thickness of a powder layer to be formed thereon, formation of the powder layer sometimes becomes difficult.

In addition, because unnecessary metal powder adheres to the surface of the shaped object, good working properties are desired in machining the shaped object to remove the unnecessary metal powder to expose a high-density surface region.

As a matter of course, no large cracks must be present in the surface of the shaped object, and considering that a fluid medium such as cooling water is caused to flow through, for example, an injection molding die, no microcracks are desired in an internal structure thereof.

The metal powder composition irradiated with the optical beam partly or entirely melts and then solidifies by subsequent rapid cooling to turn into a sintered material. A high wettability during melting increases the bonding area between the molten material and adjacent sintered material, and a high flowability reduces the rise or protrusion. For this reason, the high wettability and the high flowability are desired.

In the light of the above, the inventors of this application proposed a metal powder composition as disclosed in Japanese Laid-Open Patent Publication No. 2001-152204. This metal powder composition contains chrome molybdenum steel powder, phosphor copper or manganese copper powder, and nickel powder. Chrome molybdenum steel is employed for its strength or toughness, phosphor copper or manganese copper is employed for its wettability or flowability, and nickel is employed for its working properties.

The metal powder composition referred to above offered generally good results in obtaining a shaped object having a density difference between a surface region and an internal region, but still has room for improvement in wettability, flowability and working properties (machinability).

As shown in FIG. 11 depicting a photograph, at a magnification of 25, of a section of a shaped object obtained from a conventional metal powder composition, a portion sintered at a high density has microcracks formed therein, which in turn deteriorate the shaped object particularly when it is used as a forming die.

SUMMARY OF THE INVENTION

The present invention has been developed to overcome the above-described disadvantages.

It is accordingly an objective of the present invention to provide a metal powder composition that can be used in selective laser sintering to obtain a shaped object free from microcracks and superior in shaping properties when sintered.

Another objective of the present invention is to provide a method of readily making the metal powder composition referred to above.

A further objective of the present invention is to provide a shaped object that can be used as an injection molding die.

In accomplishing the above and other objectives, the metal powder composition according to the present invention includes an iron-based powder material, a nickel and/or nickel alloy powder material, a copper and/or copper alloy powder material, and a graphite powder material. The graphite powder material acts to improve the wettability during melting or to reduce microcracks during solidification.

Preferably, the proportion of the graphite powder material ranges from 0.2 weight percent to 1.0 weight percent. If the proportion of the graphite powder material is less than 0.2 weight percent or exceeds 1.0 weight percent, the effect of reducing microcracks is reduced.

When the proportion of the graphite powder material ranges from 0.2 weight percent to 1.0 weight percent, it is further preferred in terms of reduction of microcracks or improvement in shaping properties that the proportion of the iron-based powder material ranges from 60 weight percent to 90 weight percent, the proportion of the nickel and/or nickel alloy powder material ranges from 5 weight percent to 35 weight percent, and the proportion of the copper and/or copper alloy powder material ranges from 5 weight percent to 15 weight percent.

More specifically, if the proportion of the nickel and/or nickel alloy powder material is less than 5 weight percent, it is likely that the shaped object contains cracks. On the other hand, if the proportion of the nickel and/or nickel alloy powder material exceeds 35 weight percent, the shaped object is subject to large heat contraction by rapid cooling and easily separated from a shaping plate made of, for example, iron. If the proportion of the copper and/or copper alloy powder material is less than 5 weight percent, the wettability or flowability during melting, which is required for the material for selective laser sintering, is lost. On the other hand, if the proportion of the copper and/or copper alloy powder material exceeds 15 weight percent, the adhesion force between the shaped object (iron alloy containing much copper) and the shaping plate is reduced, resulting in separation of the shaped object from the shaping plate.

When at least one of a condition that the iron-based powder material includes a chrome molybdenum steel powder material and a condition that the copper alloy powder material includes a copper manganese alloy material is satisfied, the characteristics of the shaped object are further improved by addition of the graphite powder material.

It is particularly preferred that the proportion of the chrome molybdenum steel powder material ranges from 60 weight percent to 80 weight percent, the proportion of the nickel powder material ranges from 15 weight percent to 25 weight percent, the proportion of the copper manganese alloy powder material ranges from 5 weight percent to 15 weight percent, and the proportion of the graphite powder material ranges from 0.2 weight percent to 0.75 weight percent.

Although each of the iron-based powder material, the nickel and/or nickel alloy powder material, and the copper and/or copper alloy powder material preferably has an average particle diameter ranging from 5 μm to 50 μm, it is further preferred that the average particle diameter of the iron-based powder material be less than that of the nickel and/or nickel alloy powder material and that of the copper and/or copper alloy powder material. The use of iron-based powder material having an average particle diameter less than about three quarters of that of the nickel and/or nickel alloy powder material and the copper and/or copper alloy powder material is particularly preferred.

If the average particle diameter of the iron-based powder material, that of the nickel and/or nickel alloy powder material, or that of the copper and/or copper alloy powder material is less than 5 μm, cohesion of the powder composition is caused, reducing the flowability of the powder composition and making it impossible to form a high-density powder layer. If the average particle diameter exceeds 50 μm, the powder layer cannot have a thickness less than 50 μm, making it difficult to realize high-precision shaping.

In order to laminate the metal powder composition generally uniformly at a high density, the powder particles are preferably spherical and have a relatively narrow particle size distribution. However, when the metal powder composition is added with the graphite powder material, it is further preferred that the iron-based powder material be mainly composed of aspherical particles, while each of the nickel and/or nickel alloy powder material and the copper and/or copper alloy powder material be mainly composed of spherical particles. Particularly when the iron-based powder material is a chrome molybdenum steel powder material, it preferably has an average particle diameter less than 25 μm. The metal powder composition may be "granulated powder composition", which is known as having generally spherical particles that are obtained by solidifying extremely fine powder particles with a binder (bonding agent).

A method of making the metal powder composition according to the present invention is characterized by mixing graphite flakes in a mixture of the iron-based powder material, the nickel and/or nickel alloy powder material, and the copper and/or copper alloy powder material, and crushing a resultant mixture. This method enables easy handling and uniform distribution of graphite.

Because a three-dimensional object shaped by sintering the metal powder composition referred to above have no cracks on the surface thereof and almost no microcracks in the internal structure thereof, the three-dimensional object may have a density difference in a surface region and an internal region and can be used as an injection molding die.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on application Nos. 2003-48263 and 2003-281260 filed Feb. 25, 2003 and Jul. 28, 2003, respectively, in Japan, the content of which is herein expressly incorporated by reference in its entirety.

Figure 1:
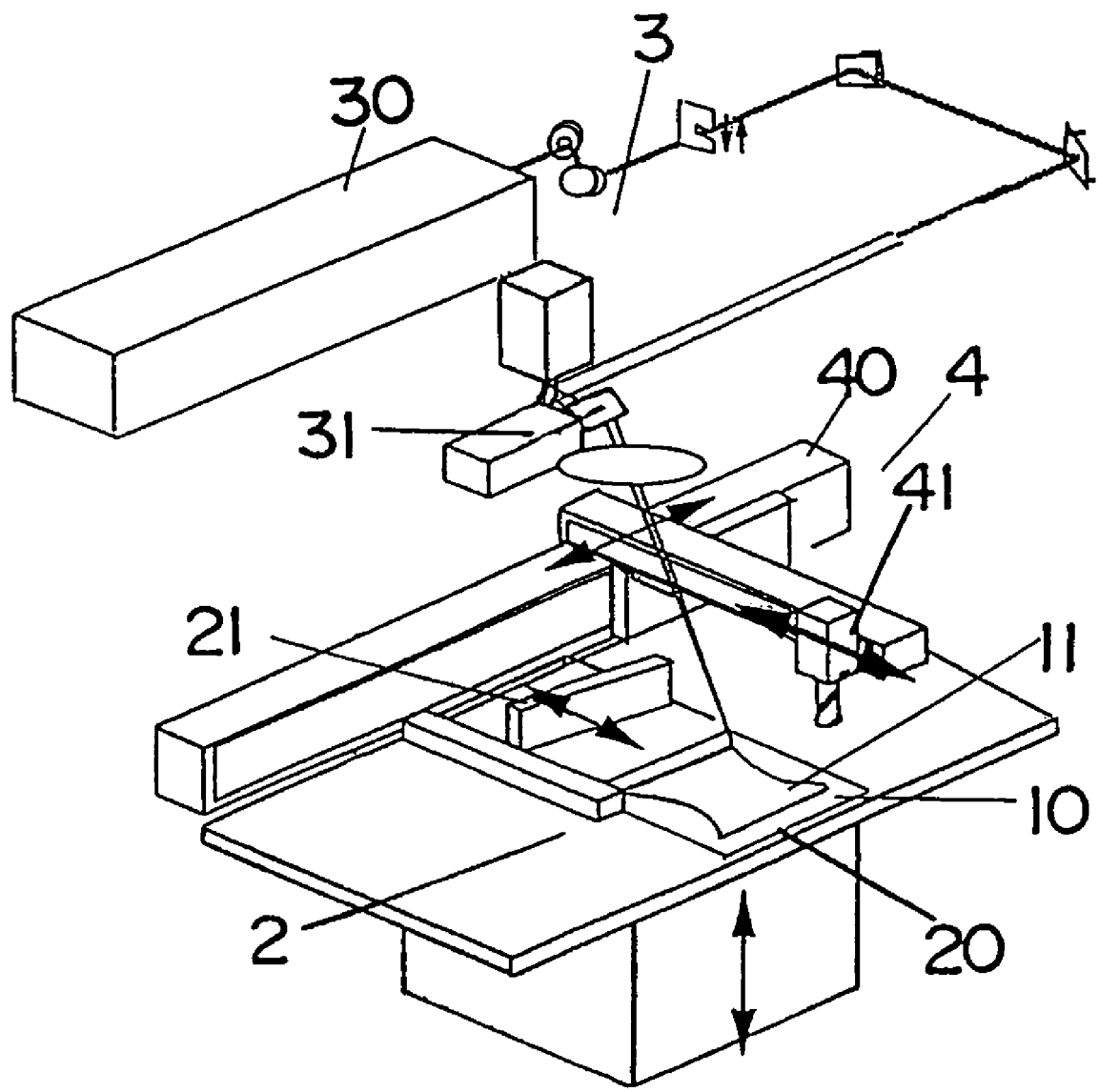
FIG. 1 is a schematic perspective view of an apparatus for making a three-dimensional object with the use of a metal powder composition according to the present invention.

FIG. 1 depicts an apparatus for selective laser sintering. The apparatus shown therein includes a powder layer-forming unit 2 for forming a powder layer 10, a sintered layer-forming unit 3 for forming a sintered layer 11, and a surface layer-removing unit 4 for removing a low-density surface layer. The powder layer-forming unit 2 forms the powder layer 10 of a predetermined thickness Δt1 by first supplying a metal powder composition on a vertically movable table 20 that is moved vertically within a limited space by a cylinder and by subsequently leveling the powder composition with the use of a leveling blade 21. The sintered layer-forming unit 3 forms the sintered layer 11 by irradiating a laser emitted from a laser beam generator 30 on the powder layer 10 via a scanning optical system including a deflector 31 and the like. A laser oscillator is preferably used as the laser beam generator 30, and a galvanomirror is preferably used as the deflector 31. The surface layer-removing unit 4 includes an XY drive unit 40 mounted on a base of the powder layer-forming unit 2 and a finishing machine 41 mounted on the XY drive unit 40. A cutting machine such as an end mill, a drilling machine or the like is preferably used as the finishing machine 41.

Figure 2:
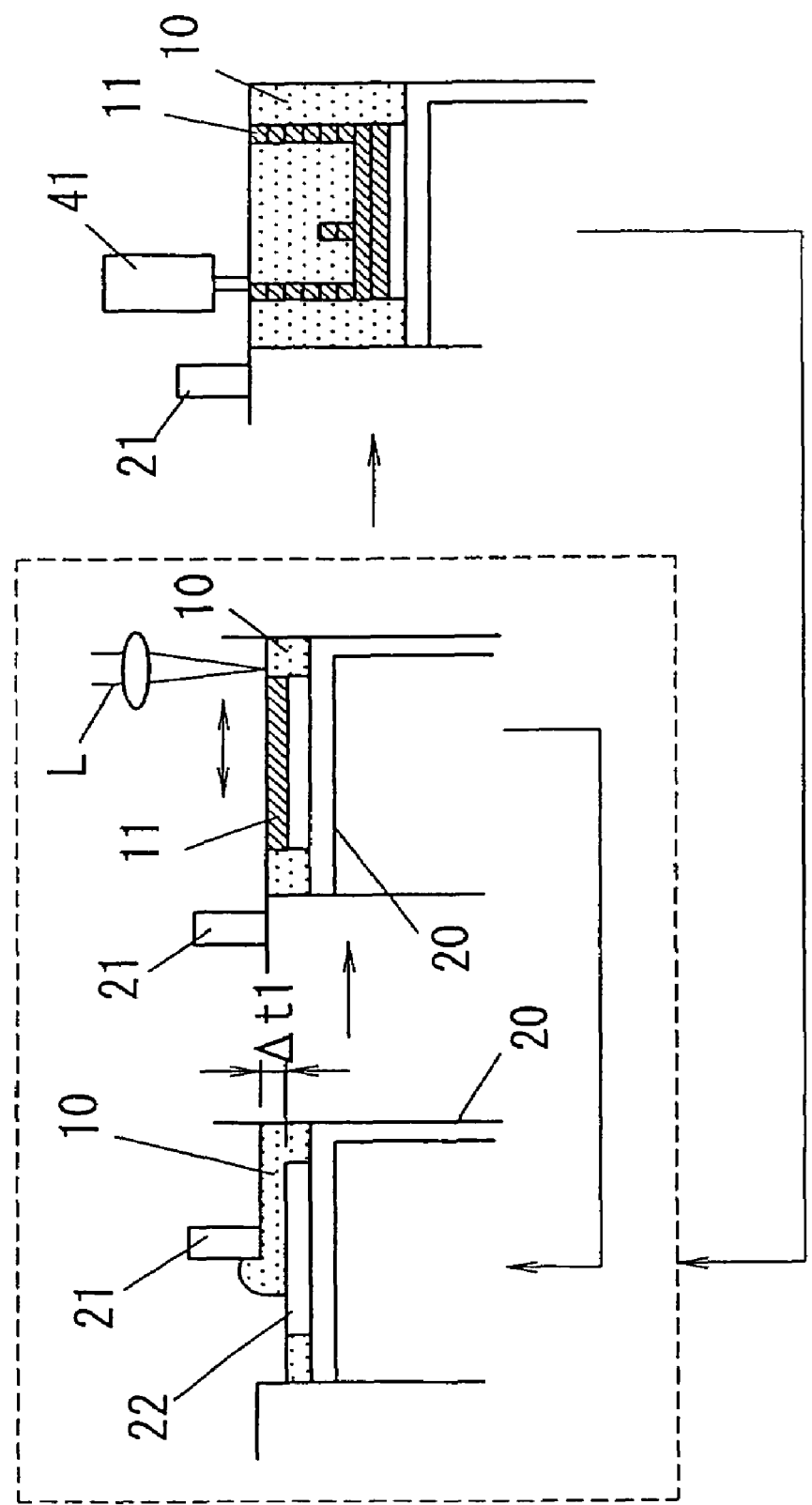
FIG. 2 is a schematic elevational view of the three-dimensional object being created.

FIG. 2 depicts how to make a three-dimensional object using the apparatus referred to above. As shown therein, a metal powder composition is first supplied on a base 22 mounted on the vertically movable table 20, which is employed as a distance regulator for regulating the distance between the sintered layer-forming unit 3 and a sintered layer. The powder composition supplied on the base 22 is then leveled by the leveling blade 21 to form a first powder layer 10, and an optical beam (laser beam) L is irradiated on a desired portion of the first powder layer 10 to sinter it, thereby forming a sintered layer 11 united with the base 22.

Thereafter, the vertically movable table 20 is lowered by a predetermined length, and a second powder layer 10 is formed by supplying the metal powder composition again and by leveling it using the leveling blade 21. The optical beam L is again irradiated on a desired portion of the second powder layer 10 to sinter it, thereby forming another sintered layer 11 united with the underlying sintered layer 11.

The process of forming a new powder layer 10 after the vertically movable table 20 has been lowered and the process of irradiating the optical beam L on a desired portion of the new powder layer 10 to form a new sintered layer 11 are repeatedly carried out, thereby making a target three-dimensional object. A $CO_2$ laser is preferably used as the optical beam. In applications where the three-dimensional object is a forming die, the preferred thickness Δt1 of each powder layer 10 is about 0.05 mm.

Data indicative of a path for laser irradiation and data indicative of a path for cutting are prepared from three-dimensional CAD data designed in advance to indicate the desired shape. In determining the path for laser irradiation, the target shape is defined by contour data for each section that has been obtained by slicing STL data, created from a three-dimensional CAD model, at equal pitches (0.05 mm in the case where Δt1 is 0.05 mm). It is preferred that the irradiation of the optical beam be conducted so that at least a surface region of the three-dimensional object is sintered to have a high density (for example, a porosity less than 5%), while an inside of the three-dimensional object is sintered to have a low density. That is, the model data are divided into those for the surface region and those for the inner region, and the optical beam is irradiated under the conditions in which the inner region comes to be porous and the surface region comes to have a high density upon melting of most of the powder composition therein, making it possible to obtain a shaped object having a dense surface at a high speed.

During the formation of a plurality of sintered layers 11, when the total thickness thereof reaches a specific value that has been determined from the tool length of, for example, a milling head 41, the surface layer-removing unit 4 is activated to cut the surface of the three-dimensional object that has been shaped by that time. For example, a tool (ball end mill) of the milling head 41 having a diameter of 1 mm and an effective blade length of 3 mm can achieve cutting of a depth of 3 mm. Accordingly, if the thickness Δt1 of the powder layer 10 is 0.05 mm, the surface layer-removing unit 4 is activated when sixty sintered layers 11 have been formed.

The surface layer-removing unit 4 can remove a low-density surface layer created by adhesion of the powder to the surface of the shaped object and can simultaneously cut out a portion of the high-density region, thereby exposing the high-density region over the entire surface of the shaped object. To this end, the shape of the sintered layers 11 is formed into a size slightly greater than that of the desired shape.

As described previously, the path for cutting as well as the path for laser irradiation is prepared from the three-dimensional CAD data. Although the path for cutting is determined based on the so-called contour-line processing, the vertical pitch of the path for cutting is not always required to be the same as the pitch of lamination during sintering. If the target object has a gentle slope, a smooth surface can be obtained by reducing the vertical pitch.

Although in the illustrated embodiment the apparatus includes a surface layer-removing unit 4 for cutting work in the course of shaping, the present invention is also applicable to normal selective laser sintering in which no surface layer-removing unit is employed and no cutting work is conducted in the course of shaping.

In making a three-dimensional object with the use of the selective laser sintering referred to above, the kind of a metal powder composition to be used has a great influence on the shaping properties or the quality of the shaped object. In the practice of the present invention, a mixture of iron-based powder material, nickel powder and/or nickel alloy powder material, copper powder and/or copper alloy powder material, and graphite powder material is used.

Although graphite is also used in sintering iron-based powder for the purpose of lowering the melting point of the composition to be sintered or enhancing the sintering density, graphite has been hitherto considered to be unnecessary in melting the considerably thin powder layer 10 having a thickness of Δt1=0.05 mm by irradiation of an optical beam thereon. However, the inventors of this application have discovered that addition of graphite powder is considerably effective to improve the wettability during melting or to reduce microcracks during solidification of high-density portions.

Figure 3:
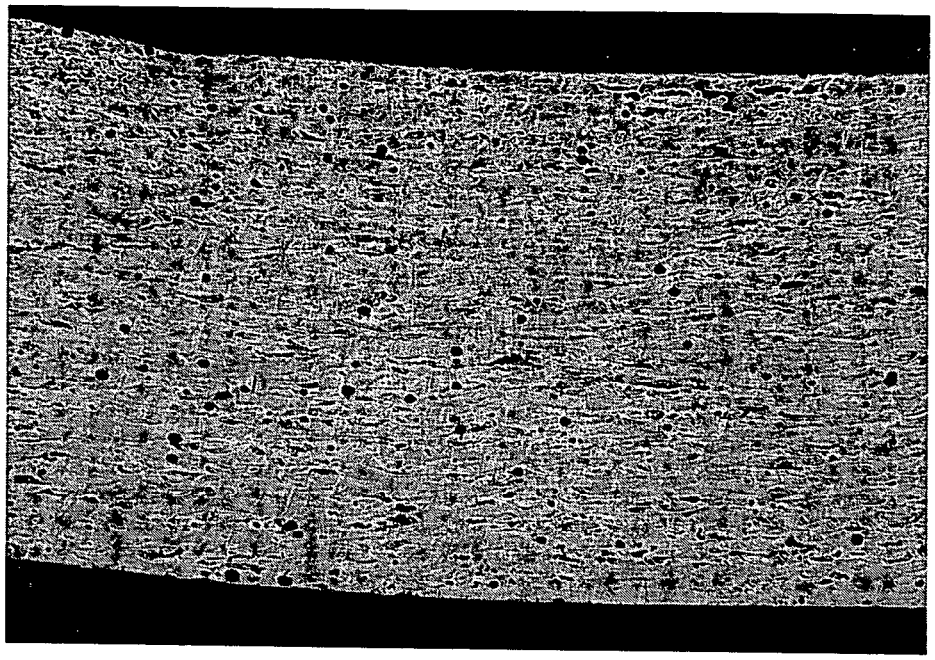
FIG. 3 is a photograph, at a magnification of 25, of a section of a shaped object obtained from metal powder added with graphite powder.

FIG. 3 depicts a section of a shaped object added with graphite powder, particularly revealing that the shaped object is dotted with lumps of graphite.

The proportion of graphite powder depends upon that of a metal powder composition and is preferably less than about 1 weight percent. In particular, when the proportion of iron-based powder is 60-90 weight percent, that of nickel powder and/or nickel alloy powder is 5-35 weight percent, and that of copper powder and/or copper alloy powder is 5-15 weight percent, it is preferred that the proportion of graphite powder is in the range of 0.2-1.0 weight percent. If the proportion of graphite powder exceeds 1 weight percent, the effect of reducing microcracks considerably reduces, resulting in generation of microcracks to the extent similar to the case where no graphite powder is added.

Powder of a chrome molybdenum steel and powder of a copper-manganese alloy are preferably used as the iron-based powder and the copper alloy powder, respectively. When at least one of such two conditions is satisfied, the characteristics of the shaped object added with graphite powder can be assuredly improved.

When the proportion of chrome molybdenum steel powder is 60-80 weight percent, that of nickel powder is 15-25 weight percent, that of copper-manganese alloy powder is 5-15 weight percent, and that of graphite powder is 0.2-0.75 weight percent, the high-density portions are free from microcracks, and desired shaping properties can be obtained with respect to both the high-density portions and the low-density portions.

It is preferred that all the iron-based powder, the nickel powder and/or nickel alloy powder, and the copper powder and/or copper alloy powder have an average particle diameter of 5-50 μm. If the particle diameter is too small, cohesion of the powder composition is caused. Accordingly, when the thickness $\Delta t1$ of the powder layer 10 is 0.05 mm, the average particle diameter is set to be about 30 μm.

Because the metal powder composition is laminated generally uniformly at a high density, it is preferred that the powder particles are spherical and have a relatively narrow particle size distribution. However, where graphite powder is added, it is preferred that the iron-based powder be mainly composed of aspherical particles, while the nickel powder and/or nickel alloy powder and the copper powder and/or copper alloy powder be mainly composed of spherical particles. In particular, in the case where the iron-based powder is chrome molybdenum steel powder that is mainly composed of aspherical particles and has an average particle diameter less than 25 μm and also less than about three quarters of the average particle diameter of the nickel powder and/or nickel alloy powder or the copper powder and/or copper alloy powder, good results can be obtained.

EXAMPLES

Figure 4:
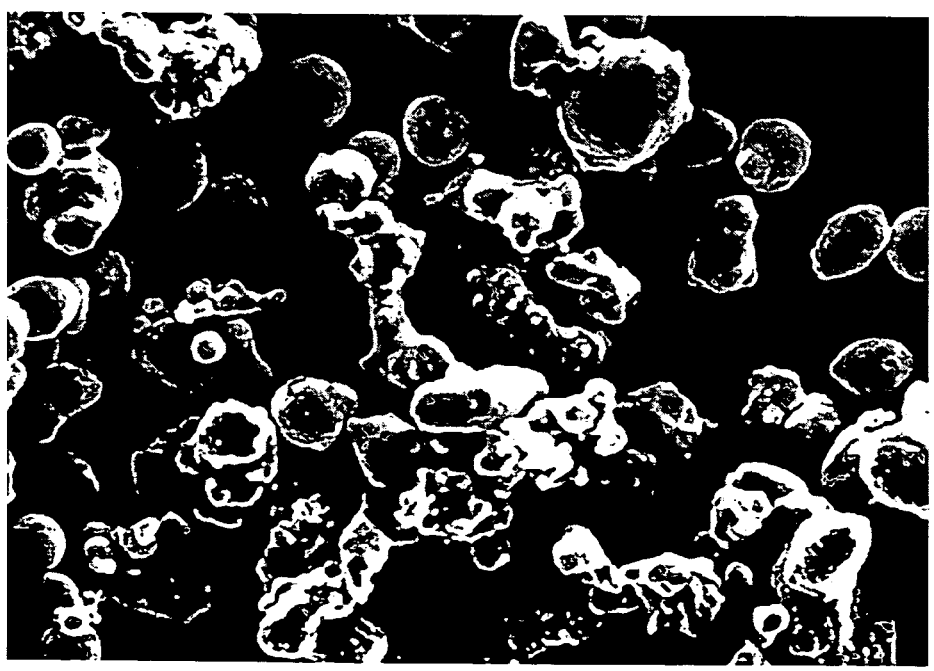
FIG. 4 is an SEM photograph of chrome molybdenum steel powder mainly composed of aspherical particles.
Figure 5:
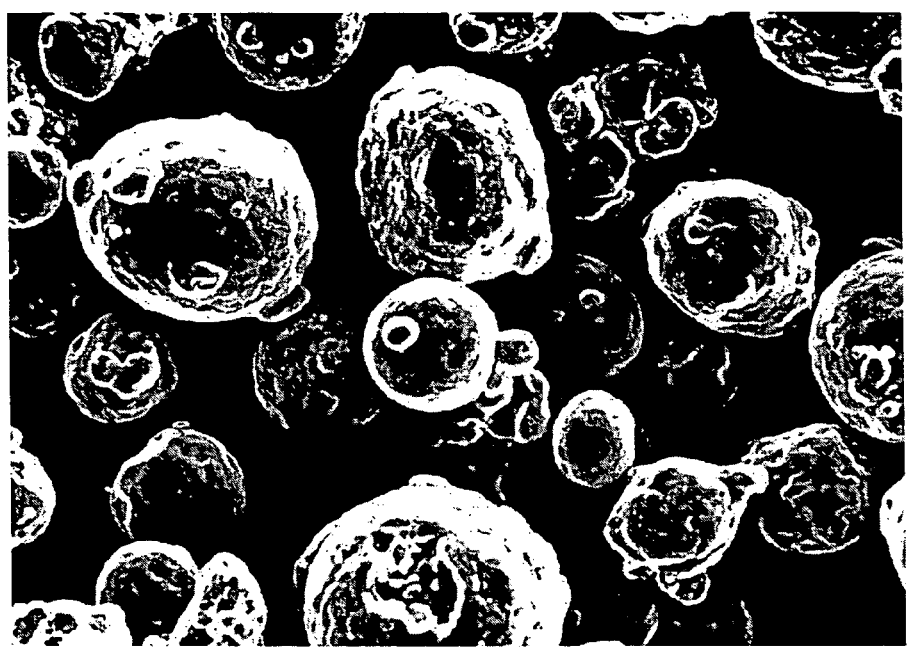
FIG. 5 is an SEM photograph of nickel powder mainly composed of spherical particles.
Figure 6:
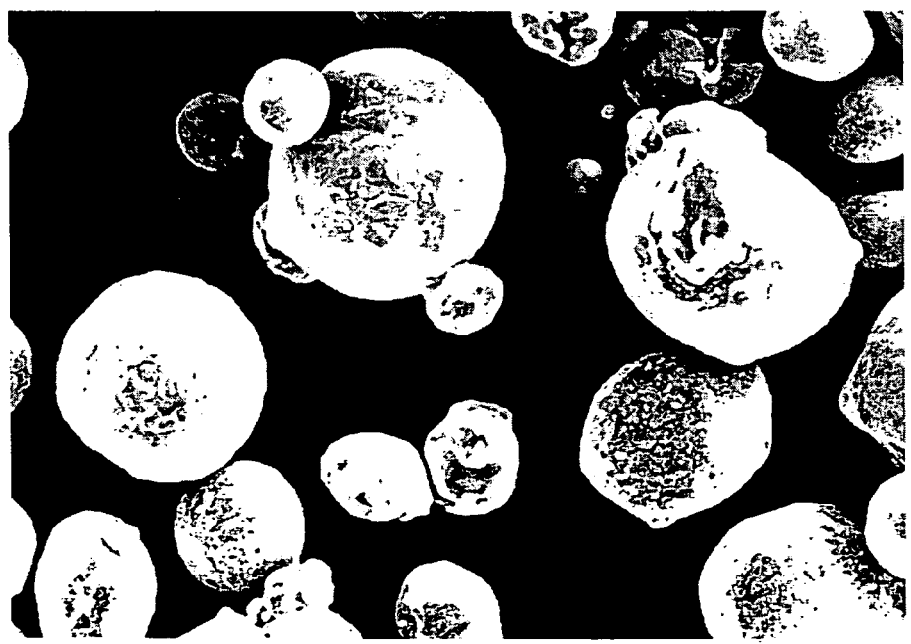
FIG. 6 is an SEM photograph of copper manganese alloy powder mainly composed of spherical particles.

Six kinds of metal powder compositions were prepared using SCM440 (chrome molybdenum steel) powder that is mainly composed of aspherical particles and has an average particle diameter of 20 μm (see FIG. 4), Ni (nickel) powder that is mainly composed of spherical particles and has an average particle diameter of 30 μm (see FIG. 5), and CuMnNi (copper-manganese alloy made of, for example, Cu-10 wt % Mn-3 wt % Ni) powder that is mainly composed of spherical particles and has an average particle diameter of 30 μm (see FIG. 6). The six kinds of metal powder compositions were added with a varying proportion of C (graphite) as indicated below.

a) 70 wt % SCM440-21 wt % Ni-9 wt % CuMnNi
b) 70 wt % SCM440-21 wt % Ni-9 wt % CuMnNi+0.2 wt % C
c) 70 wt % SCM440-21 wt % Ni-9 wt % CuMnNi+0.4 wt % C
d) 70 wt % SCM440-21 wt % Ni-9 wt % CuMnNi+0.5 wt % C
e) 70 wt % SCM440-21 wt % Ni-9 wt % CuMnNi+0.75 wt % C
f) 70 wt % SCM440-21 wt % Ni-9 wt % CuMnNi+1.0 wt % C

The selective laser sintering was carried out under the following conditions using the six kinds of metal powder compositions (a)-(f).

Thickness of powder layer: 0.05 mm
Laser used: 200W $CO_2$ laser (output: 90%)
Scanning speed: 75 mm/sec
Scanning pitch: 0.25 mm A large number of microcracks were recognized with the metal powder composition (a) in which no graphite was added, while no microcracks were recognized with the metal powder composition (d) in which 0.5 wt % graphite was added (see FIG. 3). Only a few microcracks were recognized with the metal powder composition (c) in which 0.4 wt % graphite was added. The effect of reducing microcracks was recognized with the metal powder composition (b) in which 0.2 wt % graphite was added and with the metal powder composition (e) in which 0.75 wt % graphite was added, compared with the metal powder composition (a) in which no graphite was added. Substantially the same number or a slightly lesser number of microcracks were recognized with the metal powder composition (f) in which 1.0 wt % graphite was added, compared with the metal powder composition (a).

Thee-dimensional objects that differ in density were made under the following conditions.

i) High-density portions
Scanning speed: 75 mm/sec
Scanning pitch: 0.25 mm
ii) Intermediate-density portions
Scanning speed: 150 mm/sec
Scanning pitch: 0.5 mm
iii) Low-density portions
Scanning speed: 200 mm/sec
Scanning pitch: 0.3 mm In making the three-dimensional objects, the high-density portions and the intermediate-density portions underwent laser irradiation for each layer, while the low-density portions underwent laser irradiation for every second layer.

With the metal powder composition in which graphite powder was added, good flow characteristics (flowability) were recognized from the presence of only a few protrusions.

Another metal powder composition containing chrome molybdenum steel powder that is mainly composed of spherical particles and has an average particle diameter of 30 μm, which is identical to the average particle diameter of other non-ferrous metal powders, was prepared having the same composition as the metal powder composition (d). This metal powder composition was sintered under the following conditions.

Thickness of powder layer: 0.05 mm
Laser used: 200W $CO_2$ laser (output: 90%)
Scanning speed: 75 mm/sec
Scanning pitch: 0.25 mm With this metal powder composition, although a few microcracks were recognized and the density reduced to some extent due to the presence of holes, a substantially good shaped object could be obtained, compared with the metal powder composition (d).

Another metal powder composition was prepared and sintered under the same conditions using CuP (copper-phosphor) alloy powder in place of the copper-manganese alloy powder in the metal powder composition (d). The CuP alloy powder was mainly composed of spherical particles and had an average particle diameter of 30 μm. With this metal powder composition, the presence of microcracks was recognized and the sintered layer had an uneven upper surface, which in turn hindered formation of the next powder layer. Furthermore, the sintered layer did not have a sufficient transverse strength.

A further metal powder composition was prepared and sintered under the same conditions using CuP (copper-phosphor) alloy powder in place of the copper-manganese alloy powder in the metal powder composition (d). In this case, the copper-phosphor alloy powder was mainly composed of spherical particles and had an average particle diameter of 30 μm, and the chrome molybdenum steel powder was mainly composed of spherical particles and had an average particle diameter of 30 μm, which is identical to the average particle diameter of other non-ferrous metal powders. Although better results could be obtained compared with a combination of copper-phosphor alloy powder that was mainly composed of spherical particles and had an average particle diameter of 30 μm and chrome molybdenum steel powder that was mainly composed of aspherical particles and had an average particle diameter of 20 μm, the presence of microcracks was recognized.

The metal powder added with copper-phosphor alloy powder and the metal powder added with copper-manganese alloy powder differ in factor giving rise to microcracks. It is considered that the latter caused microcracks due to poor melting during laser sintering and that the use of chrome molybdenum steel powder having an average particle diameter less than that of other non-ferrous metal powders promotes melting to thereby reduce the number of microcracks.

In the case where chrome molybdenum steel powder mainly composed of aspherical particles was used, graphite powder scattered effectively on the surface of each particle of the chrome molybdenum steel powder, compared with chrome molybdenum steel powder mainly composed of spherical particles. Addition of graphite powder is more effective in the former case than in the latter case.

Figure 7:
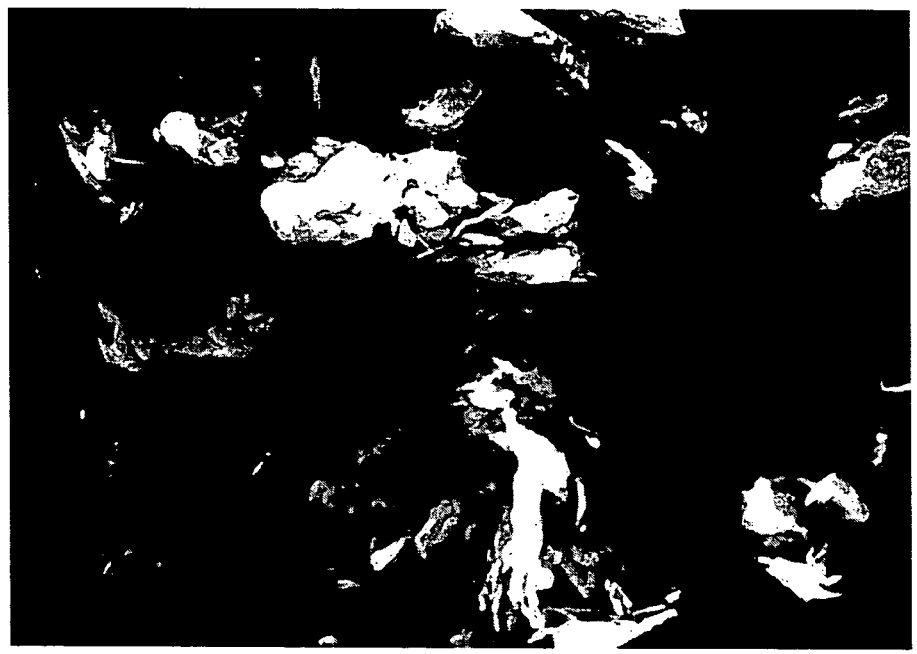
FIG. 7 is an SEM photograph of graphite flakes.
Figure 8:
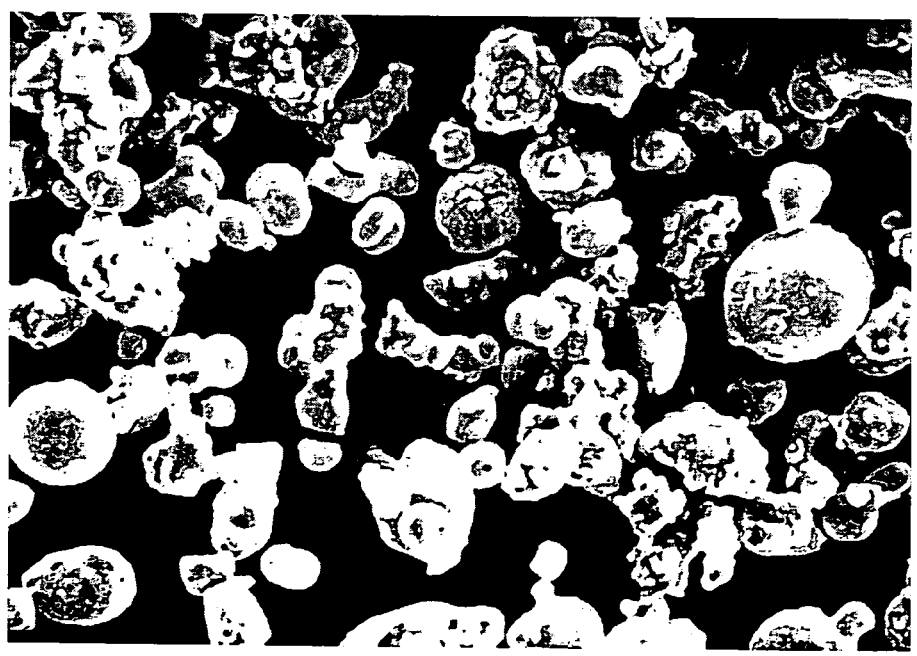
FIG. 8 is an SEM photograph of a mixture of several powders.

In mixing graphite powder with the metal powder composition containing a mixture of iron-based powder, nickel powder and/or nickel alloy powder, and copper powder and/or copper alloy powder, graphite flakes as shown in FIG. 7 were first added to the metal powder composition and then crushed or ground in a mortar. FIG. 8 depicts a resultant mixture in which no graphite powder is recognized. The reason for this is that graphite scattered effectively on the surface of the metal powder compsition, particularly chrome molybdenum steel powder mainly composed of aspherical particles. In this case, good shaping properties could be obtained and a lesser number of microcracks were recognized compared with the case where graphite powder was merely mixed with the metal powder composition.

Furthermore, another metal powder composition was prepared and sintered, particles of which had a maximum length less than the average particle diameter of the iron-based powder and particularly less than 10 μm. The sintered layer exhibited an effect of carburization in which carbon entered iron to reduce the melting point during melting by irradiation of a laser. Because the flow characteristics during melting were improved, the sintered layer had a surface reduced in unevenness.

Incidentally, graphite powder composed of ultra-fine particles having a maximum length of one to several microns can be obtained as carbon black, i.e., fine black powder that is obtained by incomplete combustion or thermal decomposition of natural gas or liquid hydrocarbon. Such graphite powder can also be obtained by jet milling.

Although black dots in FIG. 3 indicate graphite deposits, it is preferred that an element or elements for producing carbide be mixed in iron in advance. If an element or elements such as Cr (chromium), Mo (molybdenum), W (tungsten), V (vanadium), or the like is mixed in iron, carbon that tends to deposit when solidified from a molten state is united with such element to turn into carbide, making it possible to prevent deposition of carbon.

Figure 9:
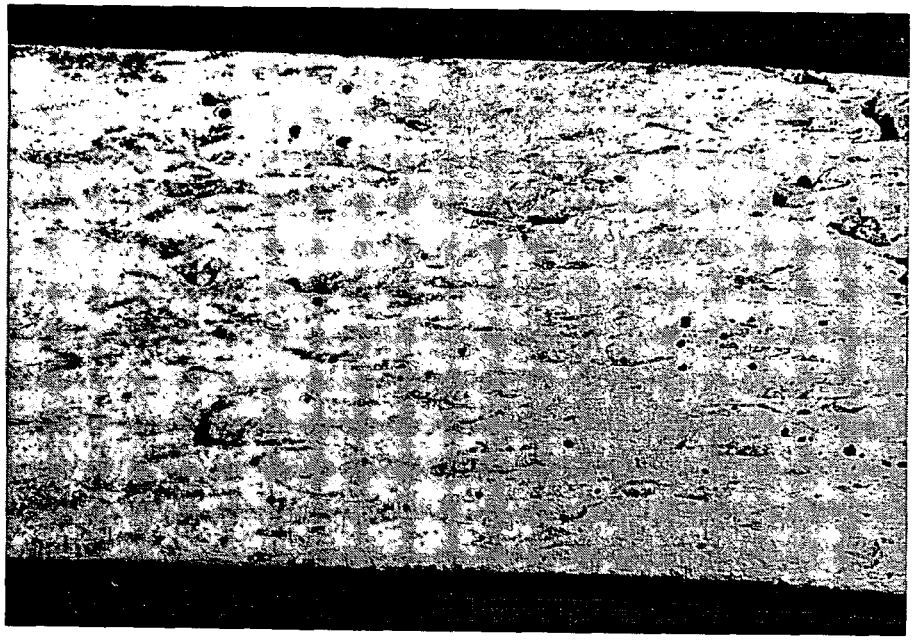
FIG. 9 is a photograph, at a magnification of 25, of a section of a shaped object obtained from metal powder added with carbide-producing elements.
Figure 10:
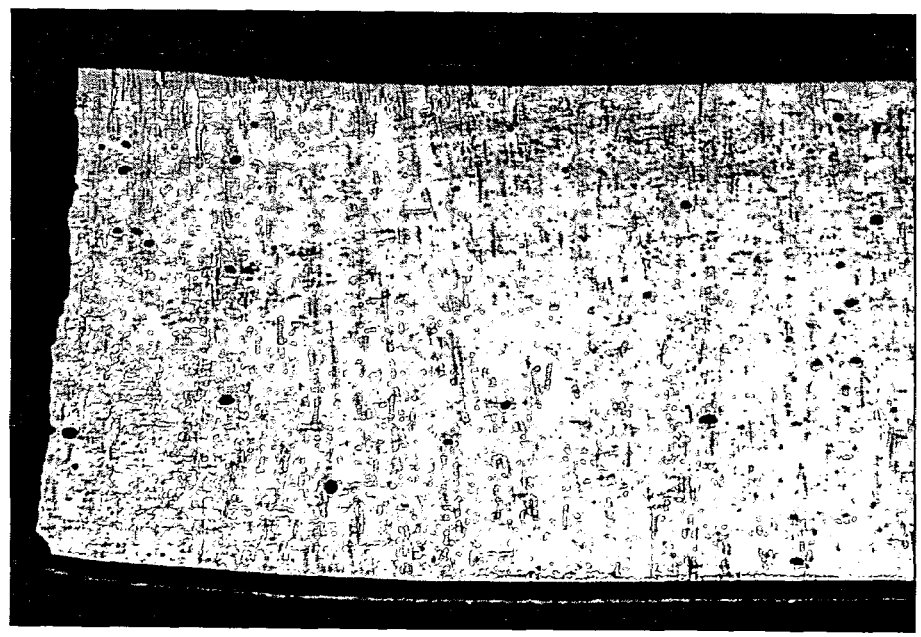
FIG. 10 is a photograph, at a magnification of 25, of a section of a shaped object obtained from metal powder added with iron-based powder containing many carbide-producing elements.
Figure 11:
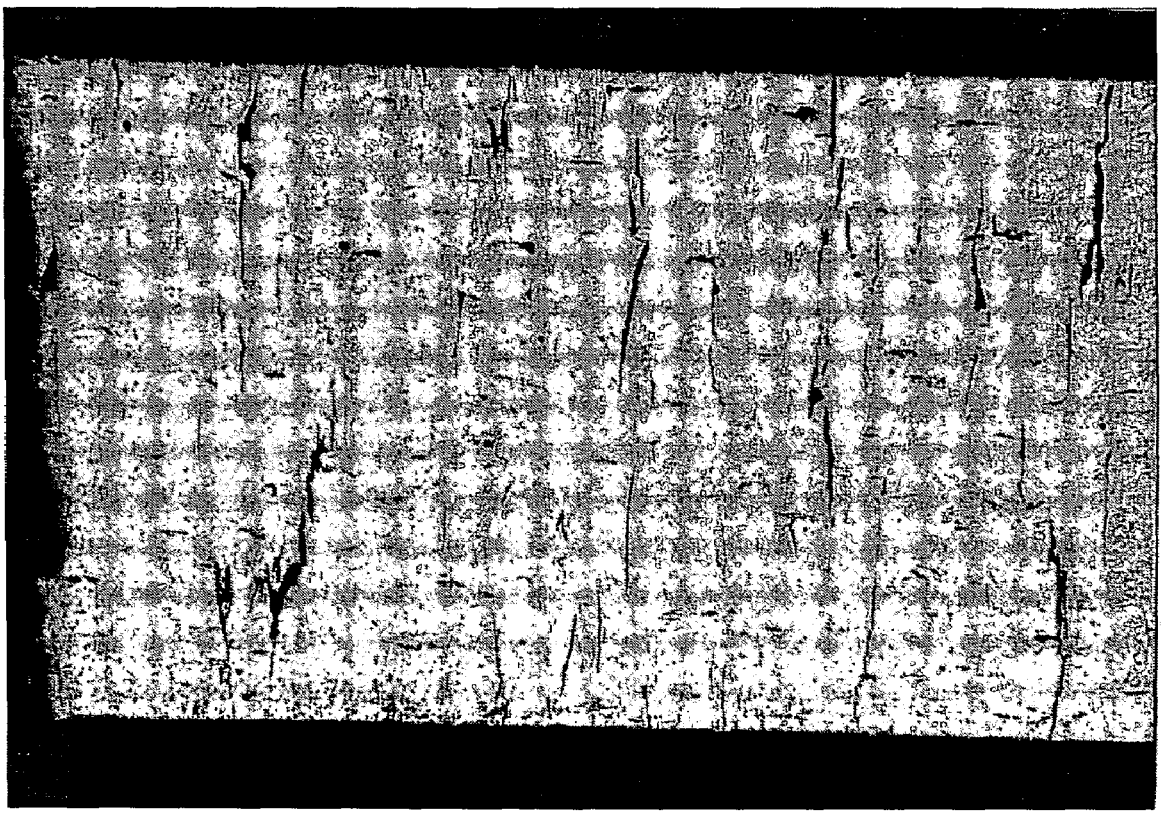
FIG. 11 is a photograph, at a magnification of 25, of a section of a shaped object obtained from conventional metal powder.

FIG. 9 is an SEM photograph in the case where W (tungsten) powder was added to the metal powder composition (d) referred to above (70 wt % SCM440-21 wt % Ni-9 wt % CuMnNi+0.5 wt % C+0.5 wt % W), while FIG. 10 is an SEM photograph in the case where iron-based powder SCM440 was replaced with SKH steel powder containing many carbide-producing elements (70 wt % SKH51-21 wt % Ni-9 wt % CuMnNi+0.5 wt % C). These photographs reveal that the shaped objects shown therein contain a reduced number of carbon deposits compared with the shaped object shown in FIG. 3 and obtained from the metal powder composition (d). The reduced number of carbon deposits enables high-density, high-strength and high-hardness shaping, and the absence of deposited carbon enhances the surface roughness after machining.

Thee-dimensional objects obtained by selectively laser sintering the above-discussed metal powder composition had sufficient characteristics for injection molding dies.

The metal powder discussed above may be "granulated powder" for ease of handling.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A metal powder composition for use in selective laser sintering, comprising:
   an iron-based powder material;
   a nickel and/or nickel alloy powder material;
   a copper and/or copper alloy powder material; and
   a graphite powder material;
   wherein at least one of a condition that the iron-based powder material comprises a chrome molybendum steel powder material and a condition that the copper alloy powder material comprises a copper manganese alloy powder material is satisfied and wherein a proportion of the chrome molybdenum steel powder material ranges from 60 weight percent to 80 weight percent, a proportion of the nickel powder material ranges from 15 weight percent to 25 weight percent, a proportion of the copper manganese alloy powder material ranges from 5 weight percent to 15 weight percent, and a proportion of the graphite powder material ranges from 0.2 weight percent to 0.75 weight percent.

2. The metal powder composition of claim 1, wherein the iron-based powder material has an average particle diameter less than that of the nickel and/or nickel alloy powder material and that of the copper and/or copper alloy powder material.

3. The metal powder composition of claim 2, wherein the average particle diameter of the iron-based powder material is less than about three quarters of that of the nickel and/or nickel alloy powder material and the copper and/or copper alloy powder material.

4. The metal powder composition of claim 1, wherein the metal powder composition comprises granulated powder.

5. A metal powder composition for use in selective laser sintering, comprising:

an iron-based powder material;

a nickel and/or nickel alloy powder material;

a copper and/or copper alloy powder material; and a graphite powder material;

wherein each of the iron-based powder material, the nickel and/or nickel alloy powder material, and the copper and/or copper alloy powder material has an average particle diameter ranging from 5 μm to 50 μm; and wherein the iron-based powder material is mainly composed of aspherical particles, while each of the nickel and/or nickel alloy powder material and the copper and/or copper alloy powder material is mainly composed of spherical particles.

6. The metal powder composition of claim 5, wherein a proportion of the graphite powder material ranges from 0.2 weight percent to 1.0 weight percent.

7. The metal powder composition of claim 5, wherein a proportion of the iron-based powder material ranges from 60 weight percent to 90 weight percent, a proportion of the nickel and/or nickel alloy powder material ranges from 5 weight percent to 35 weight percent, and a proportion of the copper and/or copper alloy powder material ranges from 5 weight percent to 15 weight percent.

8. The metal powder composition of claim 5, wherein the iron-based powder material has an average particle diameter less than that of the nickel and/or nickel alloy powder material and that of the copper and/or copper alloy powder material.

9. The metal powder composition of claim 5, wherein the average particle diameter of the iron-based powder material is less than about three quarters of that of the nickel and/or nickel alloy powder material and the copper and/or copper alloy powder material.

10. The metal powder composition of claim 5, wherein the iron-based powder material comprises a chrome molybdenum steel powder material having an average particle diameter of less than 25 μm.

11. The metal powder composition of claim 5, wherein the graphite powder material comprises particles having a maximum length less than the average particle diameter of the iron-based powder material.

12. The metal powder composition of claim 5, wherein the metal powder composition comprises granulated powder.

13. The metal powder composition of claim 5, further comprising a carbide-producing element mixed therein.

14. A method of making a metal powder composition according to claim 5, comprising:

preparing an iron-based powder material;

preparing a nickel and/or nickel alloy powder material;

preparing a copper and/or copper alloy powder material;

mixing the iron-based powder material, the nickel and/or nickel alloy powder material, and the copper and/or copper alloy powder material;

mixing graphite flakes in a mixture of the iron-based powder material, the nickel and/or nickel alloy powder material, and the copper and/or copper alloy powder material; and crushing a resultant mixture.

15. A metal powder composition for use in selective laser sintering, comprising:

an iron-based powder material;

a nickel and/or nickel alloy powder material;

a copper and/or copper alloy powder material; and a graphite powder material;

wherein at least one of a condition that the iron-based powder material comprises a chrome molybdenum steel powder material mainly composed of aspherical particles and a condition that the copper alloy powder material comprises a copper manganese alloy powder material is satisfied and wherein the composition further comprises a carbide-producing element mixed therein.

\* \* \* \* \*

UNITED STATES PATENT AND TRADEMARK OFFICE
CERTIFICATE OF CORRECTION

PATENT NO.       : 7,258,720 B2
APPLICATION NO.  : 10/780576
DATED            : August 21, 2007
INVENTOR(S)      : I. Fuwa et al.

It is certified that error appears in the above-identified patent and that said Letters Patent is hereby corrected as shown below:

At column 10, line 42 (claim 1, line 8) of the printed patent change "molybendum" to -- molybdenum --.

Signed and Sealed this

Seventeenth Day of June, 2008

JON W. DUDAS
*Director of the United States Patent and Trademark Office*